(12) United States Patent
Murai et al.

(10) Patent No.: US 11,186,738 B2
(45) Date of Patent: Nov. 30, 2021

(54) INK JET PRINTING INK, INK JET PRINTING INK SET, AND PRINTING METHOD

(71) Applicant: Seiko Epson Corporation, Tokyo (JP)

(72) Inventors: Masayuki Murai, Matsumoto (JP); Hidehiko Komatsu, Chino (JP); Hiroyuki Kaneko, Minamiminowa (JP)

(73) Assignee: Seiko Epson Corporation

( * ) Notice: Subject to any disclaimer, the term of this patent is extended or adjusted under 35 U.S.C. 154(b) by 331 days.

(21) Appl. No.: 16/145,930

(22) Filed: Sep. 28, 2018

(65) Prior Publication Data
US 2019/0100669 A1  Apr. 4, 2019

(30) Foreign Application Priority Data

Sep. 29, 2017 (JP) .............................. JP2017-190320

(51) Int. Cl.
| | | |
|---|---|---|
| *C09D 11/40* | (2014.01) | |
| *C09D 11/30* | (2014.01) | |
| *C09D 11/32* | (2014.01) | |
| *B41J 3/407* | (2006.01) | |
| *B41M 5/00* | (2006.01) | |
| *C09D 11/033* | (2014.01) | |
| *C09D 11/037* | (2014.01) | |
| *C09D 11/328* | (2014.01) | |
| *C09D 11/36* | (2014.01) | |

(52) U.S. Cl.
CPC .............. *C09D 11/40* (2013.01); *B41J 3/4078* (2013.01); *B41M 5/0023* (2013.01); *C09D 11/033* (2013.01); *C09D 11/037* (2013.01); *C09D 11/30* (2013.01); *C09D 11/32* (2013.01); *C09D 11/328* (2013.01); *C09D 11/36* (2013.01)

(58) Field of Classification Search
USPC ................ 347/84, 95, 100; 106/31.01, 31.13
See application file for complete search history.

(56) References Cited

U.S. PATENT DOCUMENTS

| | | | |
|---|---|---|---|
| 5,250,121 A | 10/1993 | Yamamoto et al. | |
| 5,674,314 A * | 10/1997 | Auslander | C09D 11/30 106/31.15 |
| 5,897,694 A | 4/1999 | Woolf | |
| 6,007,611 A | 12/1999 | Mheidle et al. | |
| 6,153,263 A | 11/2000 | Haruta et al. | |
| 6,293,667 B1 | 9/2001 | Gregory et al. | |
| 6,723,137 B1 | 4/2004 | Hakamada et al. | |
| 8,349,029 B2 | 1/2013 | Worner et al. | |
| 2003/0172840 A1 | 9/2003 | Blank et al. | |
| 2004/0003755 A1 | 1/2004 | Fukumoto et al. | |
| 2005/0036018 A1 | 2/2005 | Yanagihara et al. | |
| 2005/0172856 A1 * | 8/2005 | Hasemann | C09B 43/124 106/31.43 |
| 2007/0101900 A1 | 5/2007 | Wheeler et al. | |
| 2007/0266887 A1 | 11/2007 | Koganehira et al. | |
| 2008/0032098 A1 | 2/2008 | Hornby et al. | |
| 2012/0216356 A1 | 8/2012 | Worner et al. | |
| 2013/0328979 A1 * | 12/2013 | Shimizu | C09D 11/328 347/100 |
| 2014/0157530 A1 | 6/2014 | Murai | |
| 2014/0375733 A1 | 12/2014 | Murai et al. | |
| 2015/0166807 A1 | 6/2015 | Komatsu | |
| 2015/0252200 A1 | 9/2015 | Kagata et al. | |
| 2016/0272834 A1 * | 9/2016 | Kobayashi | C09D 11/102 |
| 2016/0326384 A1 | 11/2016 | Chen et al. | |
| 2017/0009092 A1 * | 1/2017 | Gotou | C09D 11/033 |
| 2017/0275485 A1 | 9/2017 | Oki et al. | |
| 2018/0030292 A1 * | 2/2018 | Gotou | B41J 2/01 |
| 2018/0086929 A1 | 3/2018 | Hayashi et al. | |
| 2018/0179406 A1 | 6/2018 | Miyajima et al. | |
| 2018/0179407 A1 | 6/2018 | Miyajima et al. | |
| 2018/0215939 A1 | 8/2018 | Mizuno | |
| 2018/0244934 A1 * | 8/2018 | Murai | C09D 11/50 |
| 2019/0031899 A1 | 1/2019 | Oki et al. | |
| 2019/0093283 A1 | 3/2019 | Miyajima et al. | |
| 2019/0100669 A1 | 4/2019 | Murai et al. | |
| 2019/0105919 A1 * | 4/2019 | Katsuragi | B41J 2/2114 |
| 2019/0249025 A1 | 8/2019 | Miyajima et al. | |
| 2019/0284426 A1 * | 9/2019 | Matsuzaki | B41J 2/21 |
| 2019/0292393 A1 * | 9/2019 | Murai | D06P 1/39 |
| 2020/0095443 A1 | 3/2020 | Kozaka et al. | |
| 2020/0095444 A1 * | 3/2020 | Hagiwara | C09D 11/322 |

(Continued)

FOREIGN PATENT DOCUMENTS

| | | |
|---|---|---|
| CN | 102504648 A | 6/2012 |
| CN | 107163685 A | 9/2017 |
| DE | 10135042 A1 | 2/2003 |

(Continued)

OTHER PUBLICATIONS

Hansen Solubility Parameters Table from Diversified Enterprises; https://www.accudynetest.com/solubility_table.html, accessed Dec. 16, 2020; 5 pages.*
Extended European Search Report for Patent Application No. EP18197517.8 dated Feb. 11, 2019 (11 pages).
Extended European Search Report for Application No. EP 17 20 8431 dated May 3, 2018 (8 pages).
Database WPI, Week 201651, Thomson Scientific, London, GB, AN 2016-459671, XP002780277 (2 pages), Dec. 2016.
Aptoula et al., "Morphological Description of Color Images for Content-Based Image Retrieval", IEEE Transactions on Image Processing 18(11), Dec. 2009, pp. 2505-2517, 13 pages.
Database WPI, Week 201651, Thomson Scientific, London, GB, AN 2016-459671, XP002780327 (2 pages).

(Continued)

*Primary Examiner* — Helene Klemanski
(74) *Attorney, Agent, or Firm* — Harness, Dickey & Pierce, P.L.C.

(57) ABSTRACT

An ink jet printing ink includes a colorant selected from acid dyes and reactive dyes, an organic solvent, and water. The organic solvent has a solubility parameter value greater than or equal to 11 and less than or equal to 13.5. The organic solvent also has a viscosity, at 20° C., greater than or equal to 10 mPa·s and less than or equal to 180 mPa·s.

16 Claims, No Drawings

(56) References Cited

U.S. PATENT DOCUMENTS

2020/0131390 A1 4/2020 Sakuma et al.

FOREIGN PATENT DOCUMENTS

| | | |
|---|---|---|
| EP | 1357158 A1 | 10/2003 |
| EP | 2311917 A1 | 4/2011 |
| EP | 2412761 A1 | 2/2012 |
| EP | 3091056 A1 | 11/2016 |
| EP | 3299426 A1 | 3/2018 |
| JP | 61-002772 A | 1/1986 |
| JP | H08-259867 A | 10/1996 |
| JP | H11-012957 A | 1/1999 |
| JP | 2002-241639 A | 8/2002 |
| JP | 2004-359928 A | 12/2004 |
| JP | 2004-536180 A | 12/2004 |
| JP | 2009-227895 A | 10/2009 |
| JP | 2012-511591 A | 5/2012 |
| JP | 2014-062142 A | 4/2014 |
| JP | 2015-183311 A | 10/2015 |
| JP | 2016-044258 A | 4/2016 |
| JP | 2016-044259 A | 4/2016 |
| JP | 2016-135822 A | 7/2016 |
| JP | 2017-115094 A | 6/2017 |
| JP | 2017-214457 A | 12/2017 |
| JP | 2017-214668 A | 12/2017 |
| JP | 2018-109140 A | 7/2018 |
| WO | 2010-013649 A1 | 2/2010 |

OTHER PUBLICATIONS

Database WPI, Week 201575, Thomson Scientific, London, GB, AN 2015-63684Y, (2 pages).

Database WPI, Week 198608, Thomson Scientific, London, GB, AN 1986-050894, (2 pages).

Database WPI, Week 201263, Thomson Scientific, London, GB, AN 2012-J53239 (3 pages).

Extended European Search Report for Patent Application No. EP 17208435.2 dated May 3, 2018 (10 pages).

Caprolactam datasheet, https://www.chemenu.com/products/CM200169, no date available; 2 pages.

* cited by examiner

INK JET PRINTING INK, INK JET PRINTING INK SET, AND PRINTING METHOD

BACKGROUND

1. Technical Field

The present invention relates to an ink jet printing ink, an ink jet printing ink set, and a printing method.

2. Related Art

A printing method that records an image on a fabric such as a woven fabric, a knitted fabric, and a nonwoven fabric has been known. In recent years, utilization of an ink jet recording system has been studied in terms of its capability to efficiently use an ink composition (hereinafter, also referred to as "ink") for printing, and the like. With an ink jet printing method utilizing such an ink jet recording system, an image with an ink coating film is formed on the fabric by discharging liquid droplets of ink through nozzles of an ink jet head to attach the ink to the fabric.

In order to provide an ink set for ink jet printing with preferable color reproducibility, a coloring material (colorant) in the form of an acid dye or a reactive dye is sometimes included in the ink that is used for the above-described ink jet printing method (for example, JP-A-2016-44259).

However, in the above-described ink jet printing, when the fabric is left as-is after printing without being subject to post-processing, bleeding sometimes occurs with the passage of time. The bleeding is believed to occur because the acid dye or the reactive dye has high hydrophilicity, and a hydrophilic solvent remaining in the fabric absorbs moisture (humidity) in the air which is gradually diffused into the fabric together with the dye.

Such a phenomenon more easily occurs when a plurality of inks using the acid dye and/or the reactive dye as the coloring material is recorded in a superimposed manner, and the bleeding (color bleeding) at the color boundaries in the recorded image causes deterioration in image quality.

An advantage of some aspects of the invention is to solve at least some of the above-described issues and to provide an ink jet printing ink, an ink jet printing ink set, and a printing method that suppresses color bleeding.

SUMMARY

The invention has been made in order to solve at least some of the above-described issues and can be implemented in the following aspects or application examples.

Application Example 1

An ink jet printing ink according to an aspect of the invention includes a color material (colorant) selected from acid dyes and reactive dyes, an organic solvent, and water, wherein the organic solvent has an SP (solubility parameter) value equal to or larger than (greater than) 11 and equal to or smaller than (less than) 13.5, and has a viscosity, at 20° C., equal to or larger than 10 mPa·s and equal to or smaller than 180 mPa·s.

With the ink jet printing ink of Application Example 1, the organic solvent having low hygroscopicity is constituted for the above-described color material having high hydrophilicity, so that the organic solvent has low solubility with the color material. Furthermore, the viscosity of the remaining solvent after the ink lands on the fabric and moisture evaporates is increased, so that diffusion of the color material in the fabric is suppressed. The ink jet printing ink that suppresses color bleeding can therefore be provided.

Application Example 2

In the ink jet printing ink according to the above application example, the color material can have a molecular weight of equal to or larger than 350 and equal to or smaller than 700.

With Application Example 2, the organic solvent having low hygroscopicity is constituted for the above-described color material having high hydrophilicity, so that the ink jet printing ink that suppresses the color bleeding can be provided even when the molecular weight of the color material is equal to or larger than 350 and equal to or smaller than 700.

Application Example 3

In the above application example, the organic solvent can be one or more glycol ether, one or more alkylpolyol, one or more nitrogen-containing compound, or combinations thereof.

With Application Example 3, the organic solvent that is used for the ink is one or more glycol ether, one or more alkylpolyol, one or more nitrogen-containing compound, or combinations thereof, so that the organic solvent having low hygroscopicity can be constituted and bleeding resistance is improved.

Application Example 4

In the above application example, the color material can be one or more selected from C.I. Acid Yellow 184, C.I. Acid Yellow 250, C.I. Acid Yellow 73, C.I. Acid Red 52, and C.I. Acid Red 289.

With Application Example 4, the organic solvent having low hygroscopicity is constituted for the above-described color material having high hydrophilicity, so that the ink jet printing ink that suppresses the color bleeding can be provided even when a fluorescent dye having high polarity as described above is used as the color material.

Application Example 5

An ink jet printing ink set according to another aspect of the invention, which is an ink jet printing ink set including two or more types of inks, wherein one or more of the inks is the ink jet printing ink according to any one of Application Example 1 to Application Example 4.

With the ink jet printing ink set of Application Example 5, the organic solvent having low hygroscopicity is constituted for the above-described color material having high hydrophilicity, so that the organic solvent has low solubility with the color material. Furthermore, the viscosity of the remaining solvent after the ink lands on the fabric and moisture evaporates is increased, so that diffusion of the color material in the fabric is suppressed. The ink jet printing ink set that suppresses color bleeding can therefore be provided.

Application Example 6

In the above application example, the ink jet printing ink set can include yellow ink and magenta ink, the yellow ink can contain C.I. Acid Yellow 184 as a color material, and the magenta ink can contain C.I. Acid Red 52 as a color material.

With Application Example 6, the ink jet printing ink set that suppresses the color bleeding can also be provided even when the ink set of the above-described combination is employed.

Application Example 7

In the above application example, the ink jet printing ink set can include five types of inks including two types of yellow inks, two types of magenta inks, and cyan ink, one type of the yellow inks can contain C.I. Acid Yellow 184 as a color material, and one type of the magenta inks can contain C.I. Acid Red 52 as a color material.

With Application Example 7, the ink jet printing ink set that suppresses the color bleeding can also be provided even when the ink set of the above-described combination is employed.

Application Example 8

A printing method according to still another aspect of the invention includes attaching, to a fabric, the ink jet printing ink according to any one of Application Example 1 to Application Example 4 or the ink jet printing ink set according to any one of Application Example 5 to Application Example 7, fixing, to the fabric, the color material that has been attached in the attaching, and washing the fabric after the fixing.

With the printing method of Application Example 8, the organic solvent having low hygroscopicity is constituted for the above-described color material having high hydrophilicity, so that the organic solvent has low solubility with the color material. Furthermore, the viscosity of the remaining solvent after the ink lands on the fabric and moisture evaporates is increased, so that diffusion of the color material in the fabric is suppressed. The printing method that suppresses color bleeding can therefore be provided.

Application Example 9

In the above application example, the fixing can include steam processing (a steaming process).

With Application Example 9, even when the fixing includes steaming processing, diffusion of the color material in the fabric is suppressed, so that the printing method that suppresses the color bleeding can therefore be provided.

Application Example 10

In the above application example, the fabric can include amide fibers.

With Application Example 10, the fabric has the amide fibers, so that a more excellent ink dyeing property can be provided, thereby providing the printing method further suppressing the color bleeding.

DESCRIPTION OF EXEMPLARY EMBODIMENTS

Hereinafter, several embodiments of the invention will be described. The embodiments, which will be described below, are intended to explain examples of the invention. The following embodiments do not limit the invention at all and the invention covers a variety of variations that are embodied in a range without changing the gist of the invention. All of the configurations, which will be described below, are not necessarily essential configurations.

Hereinafter, an ink jet printing ink, an ink jet printing ink set, and a printing method according to the embodiment will be described in detail.

1. INK JET PRINTING INK

The ink jet printing ink in the embodiment (hereinafter, also referred to as ink jet printing ink, ink, or the like) is attached to a fabric by an ink jet method for use. First, the ink jet printing ink is described.

One mode of the ink jet printing ink according to an embodiment of the invention includes a color material (colorant) selected from acid dyes and reactive dyes, an organic solvent, and water, wherein the organic solvent has an SP value of equal to or larger than (greater than) 11 and equal to or smaller than (less than) 13.5 and has a viscosity, at 20° C., of equal to or larger than 10 mPa·s and equal to or smaller than 180 mPa·s.

1.1. Acid Dye and Reactive Dye

The ink that is used for an image method according to the embodiment contains the color material selected from the acid dye and the reactive dye as the color material.

The acid dye is not particularly limited but examples thereof include C.I. Acid Yellow 17, 19, 23, 34, 36, 42, 49, 73, 79, 99, 110, 127, 137, 151, 166, 184, 194, 199, 204, 220, 232, 241, and 250, C.I. Acid Blue 1, 7, 9, 15, 22, 23, 25, 27, 29, 40, 41, 43, 45, 49, 54, 59, 60, 62, 72, 74, 78, 80, 82, 83, 87, 90, 92, 93, 100, 102, 103, 104, 112, 113, 114, 117, 120, 126, 127, 128, 129, 130, 131, 133, 138, 140, 142, 143, 151, 154, 156, 158, 161, 166, 167, 168, 170, 171, 175, 182, 183, 184, 185, 187, 192, 193, 201, 203, 204, 205, 207, 209, 220, 221, 224, 225, 229, 230, 239, 249, 258, 260, 264, 277:1, 278, 279, 280, 284, 290, 296, 298, 300, 317, 324, 333, 335, 338, 342, and 35, C.I. Acid Red 1, 14, 18, 33, 52, 73, 88, 97, 106, 114, 119, 131, 138, 141, 151, 182, 183, 184, 186, 195, 198, 211, 249, 252, 263, 289, 315, 337, 357, 362, 407, 414, and 423, C.I. Acid Black 1, 2, 52, 52:1, 172, 194, 210, and 234, C.I. Acid Orange 7, 8, 10, 18, 33, 51, 56, 67, 74, 86, 94, 95, 142, and 154, C.I. Acid Brown 1, 14, 45, 75, 83, 98, 106, 161, 165, 214, 288, 298, 348, 349, 355, 365, 422, 425, and 434, C.I. Acid Green 9, 16, 20, 25, 28, 68, 73, 101, and 104, and C.I. Acid Violet 17, 43, 48, 49, 54, 90, and 97.

The reactive dye is not particularly limited but examples thereof include C.I. Reactive Yellow 2, 5, 18, 22, 42, 44, 57, 77, 81, 84, 86, 95, 105, 107, 135, 145, 160, and 186, C.I. Reactive Blue 13, 15, 15:1, 19, 21, 49, 50, 59, 72, 77, 176, and 220, C.I. Reactive Red 3, 3:1, 11, 24, 24:1, 31, 35, 52, 76, 84, 111, 120, 141, 152, 180, 195, 198, 218, 226, and 245, C.I. Reactive Black 5, 8, 31, and 39, C.I. Reactive Orange 4, 7, 12, 13, 15, 16, 35, 62, 72, 78, 99, 122, and 181, C.I. Reactive Brown 11 and 18, C.I. Reactive Green 8, 12, and 15, and C.I. Reactive Violet 1, 2, 5, 13, and 33.

One type of the above-described color materials may be used alone or two or more types thereof may be used in combination.

In the embodiment, the lower limit of the molecular weight of the color material that is used for the ink may be equal to or larger than 350, may be equal to or larger than 400, or may be equal to or larger than 450. Furthermore, in the embodiment, the upper limit of the molecular weight of the color material that is used for the ink may be equal to or smaller than 700, may be equal to or smaller than 680, or may be equal to or smaller than 650. Although molecules in the above-described range have small molecular weights, have high hydrophilicity, and tend to be diffused in the fabric to easily cause bleeding to occur, the ink jet printing ink according to the embodiment, which suppresses color bleeding, can be provided by constituting an organic solvent having low hygroscopicity as will be described later.

Furthermore, in the embodiment, the color material may be C.I. Acid Yellow 184 (AY184, molecular formula of $C_{20}H_{18}N_3NaO_5S$, molecular weight of 435.4), C.I. Acid Yellow 250 (AY250, $C_{20}H_{18}N_3NaO_8S_2$, molecular weight of 515.5), C.I. Acid Yellow 73 (AY73, molecular formula of $C_{20}H_{18}N_3NaO_5S$, molecular weight of 376.27), C.I. Acid Red 52 (AR52, molecular formula of $C_{27}H_{29}N_2NaO_7S_2$, molecular weight of 580.7), and C.I. Acid Red 289 (AR289, molecular formula of $C_{35}H_{29}N_2NaO_7S_2$, molecular weight of 676.734).

These color materials are molecules having rigid structures and are fluorescent dyes (fluorescent Pink, fluorescent Yellow) that emit fluorescence by absorbing energy such as UV (ultraviolet rays) and outputting the energy as light. The above-described molecules have small molecular weights and high hydrophilicity, so that when the molecules land on the fabric, they are gradually diffused in the fabric through moisture (humidity) in the air and water and the solvent in the ink to easily cause the bleeding to occur. However, even when the above-described fluorescent dye is used, the color bleeding can be suppressed by constituting the organic solvent having low hygroscopicity, which will be described later.

The lower limit of the content of the above-described color material is preferably equal to or higher than 0.5 mass %, more preferably equal to or higher than 1 mass %, and much more preferably equal to or higher than 1.5 mass % relative to the total mass (100 mass %) of the ink composition. The upper limit of the content of the above-described color material is preferably equal to or lower than 10 mass %, more preferably equal to or lower than 6 mass %, and much more preferably equal to or lower than 4 mass % relative to the total mass (100 mass %) of the ink composition. When the content of the color material is within the above-described range, color development characteristics are improved and the color bleeding can be suppressed.

1.2. Organic Solvent

The ink jet printing ink in the embodiment contains an organic solvent. As the organic solvent, a volatile water-soluble organic solvent is preferable, and glycol ether, alkylpolyol, or nitrogen-containing compound is preferably used.

Glycol Ether

Preferably, the glycol ether is, for example, monoalkyl ether of glycol selected from ethylene glycol, diethylene glycol, triethylene glycol, polyethylene glycol, propylene glycol, dipropylene glycol, tripropylene glycol, polypropylene glycol, and polyoxyethylene polyoxypropylene glycol. More preferably, methyltriglycol (triethylene glycol monomethyl ether), butyl triglycol (triethylene glycol monobutyl ether) (278° C.), butyl diglycol (diethylene glycol monobutyl ether), and dipropylene glycol monopropyl ether, and the like are exemplified. Typically, diethylene glycol monobutyl ether (230° C.) is exemplified. Numerical values in parentheses indicate standard boiling points.

A plurality of types of glycol ethers may be mixed for use. The lower limit of the total content of glycol ether when used is preferably equal to or higher than 1 mass %, more preferably equal to or higher than 2.5 mass %, and much more preferably equal to or higher than 4 mass % relative to the total mass of the ink jet printing ink, that is, the total mass (100 mass %) of the ink composition. The upper limit of the content of the above-described glycol ether is preferably equal to or lower than 15 mass %, more preferably equal to or lower than 12 mass %, and much more preferably equal to or lower than 10 mass % relative to the total mass (100 mass %) of the ink composition. When the content of glycol ether is within the above-described range, the viscosity and the SP value of the ink jet printing ink are easily adjusted to be within a range of the invention. A moisture retention effect of glycol ether can prevent clogging of an ink jet head.

Alkylpolyol

Examples of alkylpolyol include 1,2-butanediol (194° C.), 1,2-pentanediol (210° C.), 1,2-hexanediol (224° C.), 1,2-heptanediol (227° C.), 1,3-propanediol (propylene glycol) (188° C.), 1,3-butanediol (230° C.), 1,4-butanediol (230° C.), 1,5-pentanediol (242° C.), 1,6-hexanediol (250° C.), 2-ethyl-2-methyl-1,3-propanediol (226° C.), 2-methyl-2-propyl-1,3-propanediol (230° C.), 2-methyl-1,3-propanediol (214° C.), 2,2-dimethyl-1,3-propanediol (210° C.), 3-methyl-1,3-butanediol (203° C.), 2-ethyl-1,3-hexanediol (244° C.), 3-methyl-1,5-pentanediol (250° C.), 2-methylpentane-2,4-diol (197° C.), ethylene glycol (197° C.), diethylene glycol (245° C.), dipropylene glycol (230° C.), triethylene glycol (276° C.), and glycerin (290° C.). Numerical values in parentheses indicate standard boiling points. One type of the above-described alkylpolyol may be used alone or two or more types thereof may be used in combination.

The lower limit of the total content of alkylpolyol is preferably equal to or higher than 9 mass %, more preferably equal to or higher than 12 mass %, and much more preferably equal to or higher than 15 mass % relative to the total mass of the ink jet printing ink, that is, the total mass (100 mass %) of the ink composition. The upper limit of the content of alkylpolyol is preferably equal to or lower than 32 mass %, more preferably equal to or lower than 25 mass %, and much more preferably equal to or lower than 20 mass % relative to the total mass (100 mass %) of the ink composition. When the content of alkylpolyol is within the above-described range, the viscosity and the SP value of the ink jet printing ink are easily adjusted to be within a range of the invention. Furthermore, clogging of the ink jet head is prevented.

Nitrogen-Containing Compound

Examples of the nitrogen-containing compound include nitrogen-containing heterocyclic compound such as ε-caprolactam (136° C.), N-methyl-2-pyrrolidone (204° C.), N-ethyl-2-pyrrolidone (212° C.), N-vinyl-2-pyrrolidone (193° C.), 2-pyrrolidone (245° C.), and 5-methyl-2-pyrrolidone (248° C.), urea, and dimethylurea. Numerical values in parentheses indicate standard boiling points. One type of the above-described nitrogen-containing compound may be used alone or two or more types thereof may be used in combination. The above-described nitrogen-containing compound easily dissolves the above-mentioned dye and is expected to provide effects of suppressing solidification and drying of the ink jet printing ink.

The lower limit of the total content of the nitrogen-containing compound when used is preferably equal to or higher than 4 mass %, more preferably equal to or higher than 5 mass %, and much more preferably equal to or higher than 6 mass % relative to the total mass of the ink jet printing ink, that is, the total mass (100 mass %) of the ink composition. The upper limit of the content of the nitrogen-containing compound is preferably equal to or lower than 12 mass %, more preferably equal to or lower than 10 mass %, and much more preferably equal to or lower than 8 mass % relative to the total mass (100 mass %) of the ink composition. When the content of the nitrogen-containing compound is within the above-described range, the viscosity and the SP value of the ink jet printing ink are easily adjusted to be within a range of the invention. Furthermore, clogging of the ink jet head is prevented.

Other Organic Solvents

Examples of organic solvents suitable of being used for the ink jet printing ink in the embodiment include lactones such as γ-butyrolactone and betaine compound. Usage of any of these organic solvents provides the ink moisture retention effect and an effect of controlling wettability and permeation speed to enhance the color development characteristics of an image.

In the embodiment, the lower limit of the total content of the organic solvent is preferably equal to or higher than 25 mass %, more preferably equal to or higher than 27 mass %, and much more preferably equal to or higher than 29 mass % relative to the total mass of the ink jet printing ink, that is, the total mass (100 mass %) of the ink composition. The upper limit of the content of the organic solvent is preferably equal to or lower than 32 mass %, more preferably equal to or lower than 31 mass %, and much more preferably equal to or lower than 30 mass % relative to the total mass (100 mass %) of the ink composition. When the total content of the organic solvent is within the above-described range, the viscosity and the SP value of the ink jet printing ink are easily adjusted to be within a range of the invention, diffusion of the color material is suppressed, and occurrence of the color bleeding can be suppressed. Furthermore, clogging of the ink jet head is prevented and discharge stability in the ink jet printing is provided.

Physical Property of Organic Solvent

In the embodiment, the lower limit of the SP value of the total organic solvent is equal to or larger than 11, preferably equal to or larger than 11.5, and more preferably equal to or larger than 12. The upper limit of the SP value of the total organic solvent is equal to or smaller than 13.5, preferably equal to or smaller than 13.2, and more preferably equal to or smaller than 13. When the SP value of the total organic solvent is within the above-described range, solubility with the color material becomes low and diffusion of the color material in the fabric is suppressed.

In the specification, the "SP value" is a solubility parameter. The SP value indicates a value calculated using the following Hansen's formula. The Hansen solubility parameter is provided by dividing a solubility parameter introduced by Hildebrand into three components of a dispersion term $\delta d$, a polarity term $\delta p$, and a hydrogen bond term $\delta h$, and then, representing them in a three-dimensional space. In the specification, the SP value is represented by $\delta[(cal/cm^3)^{0.5}]$ and a value calculated by using the following formula is used.

$$\delta[(cal/cm^3)^{0.5}] = (\delta d^2 + \delta p^2 + \delta h^2)^{0.5}$$

In the specification, the SP value of the total organic solvent can be calculated by performing weighted averaging on literature values or values calculated by the above-described formula.

In the embodiment, the lower limit of the viscosity of the total organic solvent is equal to or larger than 10 mPa·s, preferably equal to or larger than 20 mPa·s, and more preferably equal to or larger than 40 mPa·s. The upper limit of the viscosity of the total organic solvent is equal to or smaller than 180 mPa·s, preferably equal to or smaller than 150 mPa·s, and more preferably equal to or smaller than 130 mPa·s. When the viscosity of the total organic solvent is within the above-described range, the viscosity of the remaining solvent after the ink lands on the fabric and the moisture evaporates is increased, so that diffusion of the color material in the fabric is suppressed and the color bleeding is suppressed.

In particular, in the embodiment, by setting the lower limit of the viscosity of the total organic solvent to be equal to or larger than 10 mPa·s, the viscosity of the solvent remaining after the ink lands on the fabric and the moisture evaporates is increased, so that diffusion of the color material in the fabric is preferably suppressed and the color bleeding is suppressed. Furthermore, by setting the upper limit of the viscosity of the total organic solvent to be equal to or smaller than 180 mPa·s, the solvent easily permeates into the fabric. As a result, the surface of the fabric is easily dried, thereby suppressing progress of the color bleeding.

The viscosity can be measured using, for example, a viscoelasticity test machine MCR series (product name, manufactured by Anton Paar GmbH).

1.3. Water

The ink jet printing ink according to the embodiment contains water. Examples of water include pure water such as ion exchange water, ultrafiltrated water, reverse osmosis water, and distilled water, and water with reduced ionic impurities, such as ultrapure water. Furthermore, usage of water sterilized by irradiation with ultraviolet rays or addition of hydrogen peroxide can suppress generation of bacteria and fungi when the ink jet printing ink is stored for a long period of time.

The content of water is equal to or higher than 30 mass %, preferably equal to or higher than 40 mass %, more preferably equal to or higher than 45 mass %, and much more preferably equal to or higher than 50 mass % relative to the total mass of the ink jet printing ink. Water in the ink jet printing ink includes water when the water is contained as a raw material and water to be added, for example. By setting the content of water to be equal to or higher than 30 mass %, the ink jet printing ink can be made to have low viscosity. The upper limit of the content of water is preferably equal to or lower than 90 mass %, more preferably equal to or lower than 85 mass %, and much more preferably equal to or lower than 80 mass % relative to the total mass of the ink jet printing ink.

1.4. Other Components 1.4.1. Surfactant

The ink jet printing ink according to the embodiment may contain a surfactant. The surfactant can be used for lowering the surface tension of the ink jet printing ink and adjusting and improving wettability with the fabric (permeability into the fabric). As the surfactant, any of a nonionic-based surfactant, an anionic-based surfactant, a cationic-based surfactant, and an amphoteric surfactant can be used and they may be used in combination. Among the surfactants, an acetylene glycol-based surfactant, a silicone-based surfactant, and a fluorine-based surfactant are preferably used.

The acetylene glycol-based surfactant is not particularly limited but examples thereof include Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (all of these are product names, manufactured by Nissin Chemical co., ltd.), Olfine B, Y, P, A, STG, SPC, E1004, E1010, PD-001, PD-002W, PD-003, PD-004, PD-005, EXP.4001, EXP.4036, EXP.4051, AF-103, AF-104, AK-02, SK-14, and AE-3 (all of these are product names, manufactured by Nissin Chemical co., ltd.), Acetylenol E00, E00P, E40, and E100 (all of these are product names, manufactured by Kawaken Fine Chemicals Co., Ltd.).

The silicone-based surfactant is not particularly limited but preferable examples thereof include polysiloxane-based compounds. The polysiloxane-based compound is not particularly limited but preferable examples thereof include polyether-modified organosiloxane. Examples of commercial products of polyether-modified organosiloxane include BYK-306, BYK-307, BYK-333, BYK-341, BYK-345, BYK-346, and BYK-348 (all of these are product names, manufactured by BYK Additives & Instruments), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all of these are product names, manufactured by Shin-Etsu Chemical Co., Ltd.).

As the fluorine-based surfactant, fluorine-modified polymer is preferably used and specific examples thereof include BYK-340 (manufactured by BYK Japan KK).

When the surfactant is added to the ink jet printing ink, a plurality of types of surfactants as described above can be used. The surfactants are preferably added by equal to or higher than 0.01 mass % and equal to or lower than 3 mass %, preferably equal to or higher than 0.05 mass % and equal to or lower than 2 mass %, more preferably equal to or higher than 0.1 mass % and equal to or lower than 1.5 mass %, and particularly preferably equal to or higher than 0.2 mass % and equal to or lower than 1 mass % in total relative to the whole ink jet printing ink.

The ink jet printing ink contains the surfactant, so that stability in discharging of the ink from the ink jet head is increased. Usage of the appropriate amount of surfactant improves permeability into the fabric.

1.4.2. pH Adjuster

A pH adjuster can be added to the ink jet printing ink in the embodiment in order to adjust pH. The pH adjuster is not particularly limited and examples thereof include combinations of an acid, a base, a weak acid, and a weak base. Examples of the acid and the base that are used for the combination include, as inorganic acids, sulfuric acid, hydrochloric acid, and nitric acid, include, as inorganic base, lithium hydroxide, sodium hydroxide, potassium hydroxide, potassium dihydrogen phosphate, disodium hydrogen phosphate, potassium carbonate, sodium carbonate, sodium hydrogen carbonate, and ammonia, include, as organic bases, triethanolamine, diethanolamine, monoethanolamine, tripropanolamine, triisopropanolamine, diisopropanolamine, and tris(hydroxymethyl)aminomethane (THAM), include, as organic acids, adipic acid, citric acid, succinic acid, lactic acid, good buffers such as N,N-bis(2-hydroxyethyl)-2-aminoethanesulfonic acid (BES), 4-(2-hydroxyethyl)-1-piperazine ethanesulfonic acid (HEPES), morpholinoethanesulfonic acid (MES), carbamoylmethyliminobisacetic acid (ADA), piperazine-1,4-bis(2-ethanesulfonic acid) (PIPES), N-(2-acetamido)-2-aminoethanesulfonic acid (ACES), cholamine chloride, N-tris(hydroxymethyl)methyl-2-aminoethanesulfonic acid (TES), acetamidoglycine, tricine, glycinamide, and bicine, phosphate buffer solutions, citric acid buffer solutions, and tris buffer solutions. Preferably, the pH adjuster, as a part or the entirety thereof, contains tertiary amine such as triethanolamine and triisopropanolamine and carboxyl group-containing organic acid such as adipic acid, citric acid, succinic acid, and lactic acid among them because a pH buffering effect can be provided more stably.

When the pH adjuster is used for the ink jet printing ink in the embodiment, it is appropriately added while checking the pH. For example, the pH adjuster is preferably added by equal to or higher than 0.01 mass % and equal to or lower than 3 mass %, preferably equal to or higher than 0.1 mass % and equal to or lower than 2 mass %, and more preferably equal to or higher than 0.2 mass % and equal to or lower than 1 mass % in total relative to the total mass of the ink jet printing ink.

1.4.3. Ureas

Ureas may be added as a moisturizing agent of the ink jet printing ink or a dyeing assisting agent for improving the dyeing property of the dye. Specific examples of the ureas include urea, ethylene urea, tetramethylurea, thiourea, and 1,3-dimethyl-2-imidazolidinone. When the ureas are added, the content thereof can be set to be equal to or higher than 1 mass % and equal to or lower than 10 mass % relative to the total mass of the ink.

1.4.4. Saccharides

Saccharides may be used in order to suppress solidification and drying of the ink jet printing ink. Specific examples of the saccharides include glucose, mannose, fructose, ribose, xylose, arabinose, galactose, aldonic acid, glucitol (sorbit), maltose, cellobiose, lactose, sucrose, trehalose, and maltotriose. The above-described saccharides act as the moisturizing agent that is not the organic solvent, and the content thereof when used can be set to be equal to or higher than 1 mass % and equal to or lower than 10 mass % relative to the total mass of the ink.

1.4.5. Chelating Agent

A chelating agent may be added in order to remove unnecessary ions in the ink jet printing ink. Examples of the chelating agent include ethylenediamine tetraacetic acid and salts thereof (disodium dihydrogen ethylenediamine tetraacetate, or ethylenediamine nitrilotriacetate, hexametaphosphate, pyrophosphate, metaphosphate, or the like). When the chelating agent is added, the content thereof can be set to be equal to or higher than 0.01 mass % and equal to or lower than 1 mass % relative to the total mass of the ink.

1.4.6. Preservative and Fungicide

A preservative and a fungicide may be used for the ink jet printing ink. Examples of the preservative and the fungicide include sodium benzoate, sodium pentachlorophenol, 2-pyridinethiol-1-oxide sodium, sodium sorbate, sodium dehydroacetate, 1,2-dibenzoisothiazolin-3-one (Proxel CRL, Proxel BDN, Proxel GXL, Proxel XL.2, Proxel TN, and Proxel LV manufactured by Lonza), and 4-chloro-3-methylphenol (Preventol CMK manufactured by Bayer, and the like).

1.4.7. Others

As components other than the above-described components, additives that can be normally used in ink for an ink jet, such as a rust preventive including benzotriazole, an antioxidant, an ultraviolet absorber, an oxygen absorber, a dissolution aid, and the like maybe contained.

1.5. pH of Ink Jet Printing Ink

The ink jet printing ink in the embodiment has pH of equal to or higher than 5.8 and equal to or lower than 10.5, preferably equal to or higher than 6.0 and equal to or lower than 10.0, more preferably equal to or higher than 6.0 and equal to or lower than 9.5, and much more preferably equal to or higher than 7.0 and equal to or lower than 8.5. When the pH of the ink jet printing ink is within the above-described range, preservation stability of the dye in the ink is improved and the color development characteristics and a color phase of an image that is provided are hardly to be changed, thereby preferably reproducing colors of predetermined design.

1.6. Method for Preparing Ink Jet Printing Ink

The ink jet printing ink according to the embodiment is obtained by mixing the above-described respective components in the desired order and removing impurities by filtration or the like if needed. As a method for mixing the respective components, a method in which materials are added in order to a container including a stirring device such as a mechanical stirrer and a magnetic stirrer for stirring and mixing is preferably used. As a filtration method, centrifugal filtration, filter filtration, or the like can be performed if needed.

1.7. Physical Property of Ink Composition

The ink jet printing ink according to the embodiment has the surface tension, at 20° C., of preferably equal to or higher than 20 mN/m and equal to or lower than 40 mN/m, and more preferably equal to or higher than 22 mN/m and equal to or lower than 35 mN/m in terms of balance between printing quality and reliability as the ink jet ink. When the surface tension is within the above-described range, discharge stability is excellent in the ink jet printing and the ink easily spreads in a wetted manner uniformly in the fabric during attachment to the fabric and easily permeates thereinto. The ink is therefore easily fixed to the fabric.

The surface tension can be measured by checking the surface tension when a platinum plate is made to get wet with the ink under an environment of 40° C. or 20° C. using, for example, an automatic surface tension measuring device CBVP-Z (product name, manufactured by Kyowa Interface Science Co., Ltd).

The viscosity of the ink at 20° C. is preferably equal to or larger than 1.5 mPa·s and equal to or smaller than 10 mPa·s, more preferably equal to or larger than 2 mPa·s and equal to or smaller than 8 mPa·s, much more preferably equal to or larger than 4 mPa·s and equal to or smaller than 5.5 mPa·s, and most preferably equal to or larger than 4.5 mPa·s and equal to or smaller than 5.0 mPa·s. When the viscosity of the ink at 20° C. is within the above-described range, the ink is easier to be fixed to the fabric when being attached to the fabric.

The viscosity can be measured using, for example, the viscoelasticity test machine MCR series (product name, manufactured by Anton Paar GmbH).

As one method for making the surface tension and the viscosity are within the above-described range, various types of the above-described organic solvent and surfactant, amounts of them and water, and the like are appropriately adjusted.

1.8. Action Effects

With the ink jet printing ink in the embodiment, the organic solvent having low hygroscopicity is constituted for the above-described color material having high hydrophilicity, so that the organic solvent has low solubility with the color material. Furthermore, the viscosity of the remaining solvent after the ink lands on the fabric and moisture evaporates is increased, so that diffusion of the color material in the fabric is suppressed. The ink jet printing ink that suppresses color bleeding can therefore be provided.

2. INK JET PRINTING INK SET

An ink jet printing ink set according to the above-described embodiment can configure an ink set by combining ink jet printing inks containing other dyes of desired colors with the desired number of compositions and the desired number of colors.

For example, the ink jet printing ink set according to the embodiment is an ink jet printing ink set including two or more types of inks and can include cyan ink, magenta ink, yellow ink, and black ink, for example. The ink jet printing ink set in the embodiment may further include at least one type of blue ink, orange ink, red ink, and brown ink, for example.

The ink jet printing ink according to the above-described embodiment is used as at least one type among the inks included in the ink jet printing ink set. The ink jet printing ink set that suppresses color bleeding can therefore be provided.

Preferably, the ink jet printing ink set according to the embodiment can include yellow ink and magenta ink, the yellow ink can contain C.I. Acid Yellow 184 as a color material, and the magenta ink can contain C.I. Acid Red 52 as a color material.

Moreover, the ink jet printing ink set according to the embodiment may include five types of inks including two types of yellow inks, two types of magenta inks, and cyan ink, either or both types of the yellow inks may contain C.I. Acid Yellow 184 as a color material, and either or both types of the magenta inks can contain C.I. Acid Red 52 as a color material.

The ink jet printing ink set according to the embodiment uses the above-described ink jet printing ink according to the embodiment, thereby providing the ink jet printing ink set that suppresses the color bleeding.

The ink configuring the ink jet printing ink set according to the embodiment may be ink containing a color material other than the acid dye and the reactive dye unlike the above-described ink jet printing ink according to the embodiment. In this case, the above-described other components such as water, the organic solvent, and the surfactant can be blended independently other than the point that the color material is different from the above-described ink jet printing ink.

Examples of the color material other than the acid dye and the reactive dye include a direct dye, a basic dye, a disperse dye, and an oil-soluble dye.

Examples of the direct dye include C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 2, 3, 8, 10, 12, 31, 35, 63, 87, 116, 130, 149, 199, 230, and 231, C.I. Direct Black 19, 22, 80, 155, 168, and 170, C.I. Direct Orange 6, 26, 34, and 39, C.I. Direct Brown 44, 106, 115, 210, and 223, C.I. Direct Green 26, 59, and 85, and C.I. Direct Violet 9, 35, 51, and 66.

Examples of the basic dye include C.I. Basic Yellow 1, 2, 13, 19, 21, 25, 32, 36, 40, and 51, C.I. Basic Red 11, 5, 12, 19, 22, 29, 37, 39, and 92, C.I. Basic Blue 1, 3, 9, 11, 16, 17, 24, 28, 41, 45, 54, 65, and 66, and C.I. Basic Black 2 and 8.

Examples of the disperse dye include C.I. Disperse Red 60, 82, 86, 86:1, 167:1, and 279, C.I. Disperse Yellow 64, 71, 86, 114, 153, 233, and 245, C.I. Disperse Blue 27, 60, 73, 77, 77:1, 87, 257, and 367, C.I. Disperse Violet 26, 33, 36, and 57, and C.I. Disperse Orange 30, 41, and 61.

Examples of the oil-soluble dye include C.I. Solvent Yellow 16, 21, 25, 29, 33, 51, 56, 82, 88, 89, 150, and 163, C.I. Solvent Red 7, 8, 18, 24, 27, 49, 109, 122, 125, 127, 130, 132, 135, 218, 225, and 230, C.I. Solvent Blue 14, 25, 35, 38, 48, 67, 68, 70, and 132, and C.I. Solvent Black 3, 5, 7, 27, 28, 29, and 34.

One type of the above-described color materials may be used alone or two or more types thereof may be used in combination. Furthermore, the dye and a pigment may be mixed for use.

The content of the color material can be appropriately adjusted depending on applications, and is preferably equal to or higher than 0.1 mass % and equal to or lower than 10 mass %, more preferably equal to or higher than 1 mass % and equal to or lower than 5 mass %, and much more preferably equal to or higher than 1.5 mass % and equal to or lower than 3 mass % relative to the total mass (100 mass %) of the ink composition.

3. PRINTING METHOD

A printing method according to the embodiment includes an attaching process of attaching (applying), to a fabric, the ink jet printing ink set using the above-described ink jet printing ink or the above-described ink jet printing ink set, a fixing process of fixing, to the fabric, a color material that has been attached in the attaching, and a washing process of washing the fabric after the fixing.

3.1. Fabric

The ink jet printing ink according to the embodiment or inks of the respective colors, which are included in the ink jet printing ink set, are attached to the fabric for use. A material forming the fabric is not particularly limited and examples thereof include natural fibers such as cotton, hemp, wool, and silk, synthetic fibers such as polypropylene, polyester, acetate, triacetate, polyamide, and polyurethane, biodegradable fibers such as polylactic acid, and mixed spun fibers thereof. The fabric may be the above-described fiber formed into any of a woven fabric, a knitted fabric, and a nonwoven fabric. The basis weight of the fabric that is used in the embodiment is also not particularly limited and is in a range of equal to or higher than 1.0 oz and equal to or lower than 10.0 oz, preferably equal to or higher than 2.0 oz and equal to or lower than 9.0 oz, more preferably equal to or higher than 3.0 oz and equal to or lower than 8.0 oz, and much more preferably equal to or higher than 4.0 oz and equal to or lower than 7.0 oz.

The fabric that is used in the embodiment preferably contains amide fibers, for example, preferably contains polyamide fibers. Usage of such fabric can provide more excellent dyeing property of the ink jet printing ink, thereby providing the printing method further suppressing color bleeding.

3.2. Attaching Process

The printing method according to the embodiment includes the attaching process of attaching, to the fabric, either of the above-described ink jet printing ink or the above-described ink jet printing ink set.

To be specific, ink droplets of any of them, which have been discharged by the ink jet recording system, are attached to the fabric to form an image on the fabric. Any system may be used as the ink jet recording system and examples thereof include a charge deflection system, a continuous system, and an on-demand system (piezoelectric system, bubble jet (registered trademark) system). Among these ink jet recording systems, a system using a piezoelectric ink jet recording apparatus is particularly preferable.

In the attaching process, the maximum attachment amount of ink can be set to be equal to or larger than 1 $mg/cm^2$ and equal to or smaller than 200 $mg/cm^2$, preferably equal to or larger than 1 $mg/cm^2$ and equal to or smaller than 30 $mg/cm^2$, more preferably equal to or larger than 2 $mg/cm^2$ and equal to or smaller than 25 $mg/cm^2$, much more preferably equal to or larger than 5 $mg/cm^2$ and equal to or smaller than 20 $mg/cm^2$, and particularly preferably equal to or larger than 7 $mg/cm^2$ and equal to or smaller than 15 $mg/cm^2$ in terms of recording with preferable color development characteristics of the image to be recorded and desirable reproducibility of the image such as pictures and characters on the fabric.

3.3. Fixing Process

The printing method according to the embodiment includes the fixing process of fixing, to the fabric, the color material that has been attached in the attaching process.

To be specific, the fixing process is a heat treatment process of applying at least one of heat and steam to the fabric obtained in the attaching process and causes the color material (dye) in the ink to dye the fibers of the fabric. An existing well-known method can be employed as the heat treatment process, and examples thereof can include an HT method (high-temperature steaming method), an HP method (high-pressure steaming method), a thermosol method, a heat press method, and a thermofix method.

A temperature (highest temperature of the fabric) in the fixing process is preferably in a range of equal to or higher than 90° C. and equal to or lower than 110° C. in terms of reduction in damage on the fabric. With the printing method according to the embodiment, even when the fixing process is the steaming process, diffusion of the color material in the fabric can be suppressed, so that the printing method that suppresses the color bleeding can therefore be provided.

3.4. Washing Process

The printing method according to the embodiment includes the washing process of washing a printed matter. The washing process is performed after the above-described fixing process in order to remove the dye that does not contribute to dyeing of the fibers. The washing process can be performed using, for example, water or warm water a plurality of number of times if necessary and soaping processing may be performed.

3.5. Other Processes

The printing method according to the embodiment may include a preprocessing process of applying, to the fabric, preprocessing composition containing at least one of an alkaline agent and a hydrotropy agent if needed. The preprocessing process improves the dyeing property of the dye.

Examples of a method for applying the preprocessing composition to the fabric include a method for immersing the fabric into the preprocessing composition, a method of coating the fabric with the preprocessing composition using a roll coater or the like, and a method for ejecting the preprocessing composition (for example, an ink jet method and a spray method), and any of the methods can be used.

The printing method according to the embodiment may include a preprocessing composition drying process of drying the preprocessing composition applied to the fabric after the above-described preprocessing process and before the above-described attaching process. Although the preprocessing composition may be dried naturally, it is preferable for the drying to involve heating in terms of improvement in drying speed. When the preprocessing composition drying process involves heating, a heating method is not particularly limited but examples thereof include a heat press method, a normal pressure steam method, a high pressure steam method, and a thermofix method. A heat source of heating is, for example, infrared light (lamp) although not limited.

3.6. Action Effects

With the printing method according to the embodiment, the organic solvent having low hygroscopicity is constituted for the above-described color material having high hydrophilicity, so that the organic solvent has low solubility with the color material. Furthermore, the viscosity of the remaining solvent after the ink lands on the fabric and moisture evaporates is increased, so that diffusion of the color material in the fabric is suppressed. The printing method that suppresses color bleeding can therefore be provided.

4. EXAMPLES

Hereinafter, Examples and a Comparative Example will be described but the invention is not limited by the Examples. "Part" and "%" in Examples and Comparative Example are on a mass basis unless otherwise specified.

4.1. Preparation of Ink Composition

Components indicated in Table 1 were mixed and stirred for two hours by a magnetic stirrer, and then filtered using a membrane filter having a pore diameter of 5 µm to obtain ink 1 to ink 8. In Table 1 below, numerical values are in mass %, and ion exchange water was added such that the total mass of ink was 100 mass %.

TABLE 1

| | | SP value | Boiling point (°C.) | Viscosity (mP·s) | Y1 | Y2 | Y3 | Y4 | Y5 | Y6 | Y7 | Y8 | Y9 | Y10 | Y11 | Y12 | P1 | P2 | P3 | P4 | C1 |
|---|---|---|---|---|---|---|---|---|---|---|---|---|---|---|---|---|---|---|---|---|---|
| | | | | | colspan Ink composition A | | | | | | | | | | | | colspan Ink composition B | | | | Ink composition C |
| Color material | C.I. Acid Yellow 184 (mw 435.4) | 10.0 | 278.0 | 8.1 | 1.5 | 1.5 | 1.5 | 1.5 | 1.5 | 1.5 | 1.5 | 1.5 | 1.5 | 0 | 1.5 | 1.5 | 0 | 0 | 0 | 0 | 0 |
| | C.I. Acid Red 52 (mw 580.7) | | | | 0 | 0 | 0 | 0 | 0 | 0 | 0 | 0 | 0 | 0 | 0 | 0 | 3 | 3 | 3 | 0 | 0 |
| | C.I. Direct Blue 87 (mw 882.2) | | | | 0 | 0 | 0 | 0 | 0 | 0 | 0 | 0 | 0 | 0 | 0 | 0 | 0 | 0 | 0 | 0 | 4 |
| | C.I. Reactive Yellow 86 (mw 667.4) | | | | 0 | 0 | 0 | 0 | 0 | 0 | 0 | 0 | 0 | 1.5 | 0 | 0 | 0 | 0 | 0 | 0 | 0 |
| | C.I. Reactive Red 11 (mw 681.3) | | | | 0 | 0 | 0 | 0 | 0 | 0 | 0 | 0 | 0 | 0 | 0 | 0 | 0 | 0 | 0 | 3 | 0 |
| Organic solvent | Triethylene glycol monobutyl ether | 10.0 | 278.0 | 8.1 | 0 | 10 | 9.5 | 8.5 | 0 | 10 | 0 | 5.5 | 7 | 9.5 | 15 | 14 | 2.5 | 2.5 | 0 | 2.5 | 0 |
| | Dipropylene glycol | 12.1 | 230.5 | 107 | 12.5 | 7.5 | 7.5 | 6 | 9 | 0 | 0 | 0 | 6 | 7.5 | 5 | 7 | 9 | 11 | 0 | 9 | 11 |
| | 3-Methyl-1,5-pentanediol | 12.5 | 150° C./3.3 kPa | 173 | 9 | 0 | 9.5 | 9.5 | 9 | 0 | 10 | 0 | 9.5 | 9.5 | 0.5 | 0.5 | 5 | 5 | 5 | 5 | 5 |
| | Propylene glycol | 14.2 | 188.2 | 60.5 | 10 | 3 | 0 | 0 | 10 | 10 | 0 | 8 | 0 | 0 | 0 | 0 | 13 | 11 | 0 | 13 | 11 |
| | Glycerin | 16.7 | 290.0 | 1412 | 0 | 3 | 4 | 6.5 | 3.5 | 0 | 9 | 0 | 8 | 4 | 0 | 2 | 0 | 2.5 | 12 | 0 | 2.5 |
| | Triethylene glycol | 13.5 | 276.0 | 48 | 0 | 0 | 0 | 0 | 0 | 0 | 8 | 0 | 0 | 0 | 4 | 3 | 0 | 0 | 8 | 0 | 0 |
| | Ethylene glycol | 16.1 | 197.3 | 20 | 0 | 0 | 0 | 0 | 0 | 0 | 0 | 12 | 0 | 0 | 0 | 0 | 0 | 0 | 0 | 0 | 0 |
| | 2-Pyrrolidone | 11.5 | 245.0 | 17.3 | 0 | 8 | 0 | 0 | 0 | 11.5 | 4.5 | 6 | 0 | 0 | 7 | 5 | 0 | 0 | 4.5 | 0 | 0 |
| pH adjuster | Adipic acid | — | — | — | 0.15 | 0.15 | 0.15 | 0.15 | 0.15 | 0.15 | 0.15 | 0.15 | 0.15 | 0.15 | 0.15 | 0.15 | 0.15 | 0.15 | 0.15 | 0.15 | 0.15 |
| | Triethanolamine | 13.8 | — | 934 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| | Sodium hydroxide | — | — | — | 0 | 0 | 0 | 0 | 0 | 0 | 0 | 0 | 0 | 0 | 0 | 0 | 0 | 0 | 0 | 0 | 0 |
| Surfactant | Olfine E1010 | — | — | — | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Others | Proxel IXL2 | — | — | — | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| | Benzotriazole | — | — | — | 0.01 | 0.01 | 0.01 | 0.01 | 0.01 | 0.01 | 0.01 | 0.01 | 0.01 | 0.01 | 0.01 | 0.01 | 0.01 | 0.01 | 0.01 | 0.01 | 0.01 |
| | EDTA | 23.4 | 100 | 1 | 0.01 | 0.01 | 0.01 | 0.01 | 0.01 | 0.01 | 0.01 | 0.01 | 0.01 | 0.01 | 0.01 | 0.01 | 0.01 | 0.01 | 0.01 | 0.01 | 0.01 |
| Water | | | | | Residual quantity | Residual quantity | Residual quantity | Residual quantity | Residual quantity | Residual quantity | Residual quantity | Residual quantity | Residual quantity | Residual quantity | Residual quantity | Residual quantity | Residual quantity | Residual quantity | Residual quantity | Residual quantity | Residual quantity |
| Total | | | | | 100 | 100 | 100 | 100 | 100 | 100 | 100 | 100 | 100 | 100 | 100 | 100 | 100 | 100 | 100 | 100 | 100 |

TABLE 1-continued

|  | Ink composition A | | | | | | | | | | | | Ink composition B | | | | | Ink composition C |
| --- | --- | --- | --- | --- | --- | --- | --- | --- | --- | --- | --- | --- | --- | --- | --- | --- | --- | --- |
|  | Y1 | Y2 | Y3 | Y4 | Y5 | Y6 | Y7 | Y8 | Y9 | Y10 | Y11 | Y12 | P1 | P2 | P3 | P4 | C1 |
| SP value of mixed solvent | 12.9 | 11.9 | 12.2 | 12.6 | 13.4 | 11.9 | 13.8 | 13.7 | 12.9 | 12.2 | 11.2 | 11.5 | 12.9 | 13.3 | 14.3 | 12.9 | 13.3 |
| Viscosity of mixed solvent | 57 | 56 | 126 | 160 | 77 | 22 | 150 | 21 | 189 | 126 | 46 | 64 | 41 | 62 | 195 | 41 | 62 |
| Total solvent quantity | 31.5 | 31.5 | 30.5 | 30.5 | 31.5 | 31.5 | 31.5 | 31.5 | 30.5 | 30.5 | 31.5 | 31.5 | 41.0 | 29.5 | 29.5 | 29.5 | 29.5 |

Among the components indicated in Table 1, details of components other than those with compound names are as follows.

C.I. Acid Yellow 184: chemical formula of $C_{20}H_{18}N_3NaO_5S$, molecular weight of 435.4 (acid dye)

C.I. Acid Red 52: chemical formula of $C_{27}H_{29}N_2NaO_7S_2$, molecular weight of 580.65 (acid dye)

C.I. Direct Blue 87: chemical formula of $C_{47}H_{40}N_{10}Na_2O_{12}S_4$, molecular weight of 1111.1

C.I. Reactive Yellow 86: chemical formula of $C_{18}H_{14}Cl_2N_8Na_2O_9S_2$, molecular weight of 667.4 (reactive dye)

C.I. Reactive Red 11: chemical formula of $C_{28}H_{18}ClN_7NaO_{15}S_4$, molecular weight of 681.3 (reactive dye)

Olfine E1010: manufactured by Nissin Chemical co., ltd., acetylene glycol-based surfactant Proxel XL2: manufactured by Lonza, preservative EDTA: ethylenediamine tetraacetic acid 4.2. Analysis of Ink 4.2.1. Solvent Composition Ink solvent compositions were analyzed using a GC-MS (gas chromatography—mass spectrometry). First, the inks were diluted to 1000 times with methanol and samples obtained by dilution were filtered by a 0.2 μm-filter. An HP-5 ms ultra inert column (30 m×0.25 mm×0.25 μm) was joined to Agilent 5975C GC/MSD (product name, manufactured by Agilent Technologies Japan, Ltd.), measurement was performed with the following conditions and obtained pieces of data were compared with a peak area value of a detected internal standard substance to calculate the ink solvent compositions.

Analysis Conditions

Carrier gas: helium (1 mL/min)

Detector: MSD

Ionizing method: EI

Oven temperature: 50° C. (kept for 5 minutes)—(temperature increase at 10° C./min)—325° C. (kept at 10 minutes)

Pour temperature: 325° C.

Transfer temperature: 325° C.

Mass spectrum range: 20 to 800

Sprit ratio: 10:1

Injection amount: 1 μL

Internal standard substance: Octadecyl 3-(3,5-di-tert-butyl-4-hydroxyphenyl) propionate 4.2.2. Viscosity Measurement The solvent compositions described in 4.2.1. were experimentally produced and the viscosities of the produced samples were measured by the following device.

Solvent composition; solvent A (a composition ratio in the ink was X mass %), solvent B (a composition ratio in the ink was Y mass %), solvent C (a composition ratio in the ink was Z mass %)

Experimentally produced mixed solution=solvent A*X parts+solvent B*Y parts+solvent C*Z parts Device: Rheometer MCR 302 (product name, manufactured by Anton Paar GmbH)

Measurement conditions: viscosity when rotated at a rotating speed of $200S^{-1}$ for 60 seconds, temperature of 20° C.

Plate: cone plate of 50 mm

The measured viscosity is shown in Table 1 as "viscosity of mixed solvent".

4.2.3. Measurement of SP Value

The SP value of the mixed solvent was calculated by performing weighted average on the SP values of the solvent compositions described in 4.2.1. in the following manner, which were obtained by the Hansen's formula.

Solvent composition; solvent A (the composition ratio in the ink was X mass %, SP value a), solvent B (the composition ratio in the ink was Y mass %, SP value b), solvent C (the composition ratio in the ink was Z mass %, SP value c)

SP value of mixed solution=(a×X parts+b×Y parts+c×Z parts)/(X+Y+Z)

The measured SP value is shown in Table 1 as "SP value of mixed solvent".

4.3. Evaluation Test

Next, evaluation samples indicated in Table 2 according to Examples and Comparative Example to be used in the following evaluation test were produced as follows.

TABLE 2

|  | Example 1 | Example 2 | Example 3 | Example 4 | Example 5 | Example 6 | Example 7 | Example 8 | Example 9 |
|---|---|---|---|---|---|---|---|---|---|
| Ink composition A | Y1 | Y2 | Y12 | Y3 | Y1 | Y10 | Y4 | Y5 | Y6 |
| Ink composition B | P1 | P1 | P1 | P1 | P4 | P1 | P1 | P1 | P1 |
| Ink composition C | C1 | C1 | C1 | C1 | C1 | C1 | C1 | C1 | C1 |
| Bleeding of fluorescent Yellow - fluorescent Pink | 6 | 6 | 6 | 6 | 6 | 6 | 5 | 5 | 5 |
| Bleeding of fluorescent Yellow - Cyan | 5 | 5 | 5 | 5 | 5 | 5 | 4 | 4 | 4 |
| Bleeding of fluorescent Pink - Cyan | 5 | 5 | 5 | 5 | 5 | 5 | 5 | 5 | 5 |
| Overall determination (nylon fabric) | A | A | A | A | A | A | B | B | B |

|  | Example 10 | Example 11 | Example 12 | Example 13 | Example 14 | Example 15 | Example 16 | Example 17 | Comparative Example 1 |
|---|---|---|---|---|---|---|---|---|---|
| Ink composition A | Y11 | Y1 | Y7 | Y8 | Y9 | Y1 | Y4 | Y4 | Y7 |
| Ink composition B | P1 | P2 | P1 | P1 | P1 | P3 | P2 | P3 | P3 |
| Ink composition C | C1 | C1 | C1 | C1 | C1 | C1 | C1 | C1 | C1 |
| Bleeding of fluorescent Yellow - fluorescent Pink | 5 | 5 | 4 | 4 | 4 | 4 | 4 | 3 | 1 |

TABLE 2-continued

| | | | | | | | | | |
|---|---|---|---|---|---|---|---|---|---|
| Bleeding of fluorescent Yellow - Cyan | 4 | 5 | 3 | 3 | 3 | 5 | 4 | 4 | 3 |
| Bleeding of fluorescent Pink - Cyan | 5 | 4 | 5 | 5 | 5 | 3 | 4 | 3 | 3 |
| Overall determination (nylon fabric) | B | B | C | C | C | C | C | C | E |

Production of Recorded Objects

PX-G930 (manufactured by SEIKO EPSON CORPORATION) was used as the ink jet printing apparatus and the ink compositions A to C were attached to a nylon fabric with combinations indicated in Table 2 at a room temperature to form block image patterns printed while single colors are adjusted to each other with resolution of 720 dpi×720 dpi. The ink composition A is fluorescent Yellow, the ink composition B is fluorescent Pink, and the ink composition C is Cyan.

Evaluation References

Bleeding ranges of color boundary portions on the obtained recorded objects were observed to evaluate bleeding resistance with the following evaluation references for bleeding between fluorescent Yellow and fluorescent Pink, bleeding between fluorescent Yellow and Cyan, and bleeding between fluorescent Pink and Cyan.

6: The bleeding range on the color boundary was smaller than 0.6 mm
5: The bleeding range on the color boundary was equal to or larger than 0.6 mm and equal to or smaller than 0.9 mm
4: The bleeding range on the color boundary was equal to or larger than 0.9 mm and equal to or smaller than 1.2 mm
3: The bleeding range on the color boundary was equal to or larger than 1.2 mm and equal to or smaller than 1.5 mm
2: The bleeding range on the color boundary was equal to or larger than 1.5 mm and equal to or smaller than 1.8 mm
1: The bleeding range on the color boundary was equal to or larger than 1.8 mm For the overall determination, averages of three evaluation references of the bleeding between fluorescent Yellow and fluorescent Pink, the bleeding between fluorescent Yellow and Cyan, and the bleeding between fluorescent Pink and Cyan were obtained and determined by the following evaluation references.

A: larger than 5
B: larger than 4 and equal to or smaller than 5
C: larger than 3 and equal to or smaller than 4
D: larger than 2 and equal to or smaller than 3
E: larger than 1 and equal to or smaller than 2

4.4. Evaluation Results

Results of the above-described evaluation test are indicated in Table 2. In Comparative Example 1, inks deviating from the range of the invention were used for all of the ink compositions A to C, and the bleeding ranges on the color boundaries were large and color bleeding occurred. By contrast, in Examples, the bleeding ranges on the color boundaries were small and the color bleeding was suppressed.

First, an example of recording on the nylon fabric will be described. In Examples 1 to 11, two types of the ink compositions A (fluorescent Yellow) and B (fluorescent Pink) were within the range of the invention. Therefore, the bleeding ranges on the color boundaries between fluorescent Yellow and fluorescent Pink were small and the bleeding was suppressed. The bleeding was also suppressed between fluorescent Yellow and Cyan and between fluorescent Pink and Cyan, only one of the two inks being in the range of the invention. In particular, in Examples 1 to 6, the SP values of the organic solvents of the ink compositions A and B were equal to or higher than 11.5 and equal to or lower than 13, the viscosities thereof were equal to or larger than 30 mPa·S and equal to or smaller than 150 mPa·S, the bleeding ranges were smaller than those in Examples 7 to 11 overall, and the bleeding was suppressed.

As in each of Examples 12 to 15, and 17, when only one of the ink compositions A and B was within the range of the invention, the bleeding range on the color boundary at a place for which the ink within the range of the invention was used was small. Comparison among Examples 7, 16, and 17 revealed that as the SP value and the viscosity of the organic solvent of the ink composition B were increased, the color material tended to be easily diffused.

The invention is not limited to the above-described embodiment and various variations can be made. For example, the invention includes substantially the same configurations as the configurations described in the embodiment (for example, the configurations having the same functions, methods, and results or the configurations having the same objects and effects). The invention covers the configurations in which non-essential portions of the configurations described in the embodiment are replaced. Furthermore, the invention covers the configurations providing the same action effects as or the same objects as those of the configurations described in the embodiment. Moreover, the invention covers the configurations in which well-known techniques are added to the configurations described in the embodiment.

The entire disclosure of Japanese Patent Application No. 2017-190320 filed Sep. 29, 2017 is expressly incorporated by reference herein.

What is claimed is:

1. An ink jet printing ink comprising:
    a colorant that is at least one selected from the group consisting of C.I. Acid Yellow 184, C.I. Acid Yellow 250, and C.I. Acid Yellow 73;
    an organic solvent; and
    water,
    wherein the organic solvent has:
        a solubility parameter value greater than or equal to 11 and less than or equal to 13.5; and
        a viscosity, at 20° C., greater than or equal to 10 mPa·s and less than or equal to 180 mPa·s.

2. The ink jet printing ink according to claim 1,
    wherein the colorant has a molecular weight greater than or equal to 350 and less than or equal to 700.

3. The ink jet printing ink according to claim 1,
    wherein the organic solvent is one or more glycol ether, one or more alkylpolyol, one or more nitrogen-containing compound, or combinations thereof.

4. An ink jet printing ink set comprising:
two or more inks,
wherein at least one of the two or more inks includes:
a colorant that is at least one selected from the group consisting of C.I. Acid Yellow 184, C.I. Acid Yellow 250, and C.I. Acid Yellow 73;
an organic solvent; and
water,
wherein the organic solvent has:
a solubility parameter value greater than or equal to 11 and less than or equal to 13.5; and
a viscosity, at 20° C., greater than or equal to 10 mPa·s and less than or equal to 180 mPa·s.

5. The ink jet printing ink set according to claim 4, wherein the colorant has a molecular weight greater than or equal to 350 and less than or equal to 700.

6. The ink jet printing ink set according to claim 4, wherein the organic solvent is one or more glycol ether, one or more alkylpolyol, one or more nitrogen-containing compound, or combinations thereof.

7. The ink jet printing ink set according to claim 4, wherein the ink jet printing ink set includes yellow ink and magenta ink,
the yellow ink contains C.I. Acid Yellow 184, and
the magenta ink contains C.I. Acid Red 52.

8. The ink jet printing ink set according to claim 4, wherein the ink jet printing ink set includes two yellow inks, two magenta inks, and cyan ink,
at least one of the two yellow inks contains C.I. Acid Yellow 184, and
at least one of the magenta inks contains C.I. Acid Red 52.

9. A printing method comprising:
applying an ink jet printing ink to a fabric using an ink jet recording system, the ink jet printing ink including:
a colorant that is at least one selected from the group consisting of C.I. Acid Yellow 184, C.I. Acid Yellow 250, and C.I. Acid Yellow 73;
an organic solvent; and
water,
wherein the organic solvent has:
a solubility parameter value greater than or equal to 11 and less than or equal to 13.5; and
a viscosity, at 20° C., greater than or equal to 10 mPa·s and less than or equal to 180 mPa·s;
fixing the applied colorant to the fabric; and
after the fixing of the applied colorant to the fabric, washing the fabric.

10. The printing method according to claim 9, wherein the colorant has a molecular weight greater than or equal to 350 and less than or equal to 700.

11. The printing method according to claim 9, wherein the organic solvent is one or more glycol ether, one or more alkylpolyol, one or more nitrogen-containing compound, or combinations thereof.

12. The printing method according to claim 9, wherein the ink jet printing ink includes two or more inks and at least one of the two or more inks includes:
the colorant;
the organic solvent; and
the water.

13. The printing method according to claim 12, wherein the colorant has a molecular weight greater than or equal to 350 and less than or equal to 700.

14. The printing method according to claim 12, wherein the organic solvent is one or more glycol ether, one or more alkylpolyol, one or more nitrogen-containing compound, or combinations thereof.

15. The printing method according to claim 9, wherein the fixing of the applied colorant to the fabric includes a steaming process.

16. The printing method according to claim 9, wherein the fabric includes amide fibers.

* * * * *